(12) United States Patent
Rivera et al.

(10) Patent No.: US 9,742,889 B1
(45) Date of Patent: Aug. 22, 2017

(54) LIGHTED PHONE CHARGER AND CUP HOLDER DEVICE

(71) Applicant: CHEROKEE NATION ENTERTAINMENT, LLC, Catoosa, OK (US)

(72) Inventors: Lana D. Rivera, Tulsa, OK (US); Peter Ward, Tulsa, OK (US); Kevin Satterfield, Coweta, OK (US)

(73) Assignee: CHEROKEE NATION ENTERTAINMENT, LLC, Catoosa, OK (US)

(*) Notice: Subject to any disclaimer, the term of this patent is extended or adjusted under 35 U.S.C. 154(b) by 0 days.

(21) Appl. No.: 15/175,136

(22) Filed: Jun. 7, 2016

(51) Int. Cl.
| | | |
|---|---|---|
| *H04M 1/00* | (2006.01) | |
| *H04B 1/38* | (2015.01) | |
| *H04M 1/11* | (2006.01) | |
| *A47G 23/02* | (2006.01) | |
| *A47B 97/00* | (2006.01) | |
| *A47F 9/00* | (2006.01) | |

(52) U.S. Cl.
CPC .......... *H04M 1/11* (2013.01); *A47B 97/00* (2013.01); *A47F 9/00* (2013.01); *A47G 23/0216* (2013.01); *A47B 2097/003* (2013.01); *A47B 2220/0077* (2013.01); *A47B 2220/0091* (2013.01)

(58) Field of Classification Search
CPC ...... H02J 7/00; H02J 2001/002; H02J 7/0042; H02J 7/0045; H02J 7/0052
USPC .......... 455/573, 575.1, 556.1, 572
See application file for complete search history.

(56) References Cited

U.S. PATENT DOCUMENTS

| | | | |
|---|---|---|---|
| 5,934,637 A * | 8/1999 | Robinson ........... | A47G 23/0225 211/85.9 |
| 6,082,866 A | 7/2000 | Amedee | |
| 6,092,905 A | 7/2000 | Koehn | |
| 6,305,817 B1 | 10/2001 | Johnston et al. | |
| D489,578 S | 5/2004 | Lai | |
| 6,793,363 B2 | 9/2004 | Jensen | |
| 6,888,940 B1 * | 5/2005 | Deppen ............... | B60R 11/0241 379/446 |
| 7,570,918 B2 * | 8/2009 | Chen ...................... | B60R 11/02 455/346 |
| 8,113,213 B2 | 2/2012 | Pemberton | |
| 8,151,838 B2 * | 4/2012 | Seaborne ........... | A47G 19/2205 141/350 |
| 8,220,680 B1 * | 7/2012 | Everson .................. | B60R 11/02 206/320 |

(Continued)

*Primary Examiner* — Dominic Rego
(74) *Attorney, Agent, or Firm* — Millikin McKay, PLLC; Molly D. McKay

(57) ABSTRACT

The present invention is a vertically oriented device that is intended to be installed in gambling casinos or other areas where there is limited space. The device serves several functions. It is a holder for a portable telephone while the phone is being charged and when in use. The device is provided with electrical power via various types of charger cords and ports to charge a variety of phones or other electrical devices. It is a drinking cup holder that is lighted so that a drinking cup in the holder is clearly visible. It also has a directional task light located under the drinking cup holder that provides light in an area under the cup holder and adjacent the device's supporting base to accommodate a cigarette ash tray or other item that needs to be lighted so as to be seen by the user.

16 Claims, 6 Drawing Sheets

(56) References Cited

U.S. PATENT DOCUMENTS

| | | | |
|---|---|---|---|
| 8,887,423 B1* | 11/2014 | Morgan | G08B 5/006 116/63 P |
| 9,089,221 B2 | 7/2015 | Stangl et al. | |
| 9,143,180 B2 | 9/2015 | Shen et al. | |
| 2004/0261802 A1* | 12/2004 | Griffin | H02J 7/0044 131/194 |
| 2006/0186155 A1* | 8/2006 | Quijano | B60R 7/08 224/400 |
| 2008/0079388 A1* | 4/2008 | Sarnowsky | H02J 7/0042 320/103 |
| 2011/0062916 A1* | 3/2011 | Farahani | H01Q 1/248 320/108 |
| 2011/0187323 A1 | 8/2011 | Gourley | |
| 2012/0235636 A1* | 9/2012 | Partovi | H02J 7/025 320/108 |
| 2012/0242462 A1* | 9/2012 | Nagara | G06F 1/1632 340/407.1 |
| 2012/0285907 A1* | 11/2012 | Emmons | F16M 13/00 211/26 |
| 2015/0022019 A1* | 1/2015 | Swaans | H02J 7/0027 307/104 |
| 2015/0035479 A1* | 2/2015 | Wright | H02J 7/0045 320/107 |
| 2015/0182046 A1* | 7/2015 | Walsh | A47G 19/2227 206/459.5 |
| 2015/0360606 A1* | 12/2015 | Thompson | B60Q 3/0283 362/490 |
| 2016/0154170 A1* | 6/2016 | Thompson | F21V 33/00 362/609 |
| 2016/0242564 A1* | 8/2016 | Cass | A47C 31/00 |
| 2016/0276865 A1* | 9/2016 | Pike | B60R 11/0241 |
| 2016/0282040 A1* | 9/2016 | Wenji | F25D 31/006 |

* cited by examiner

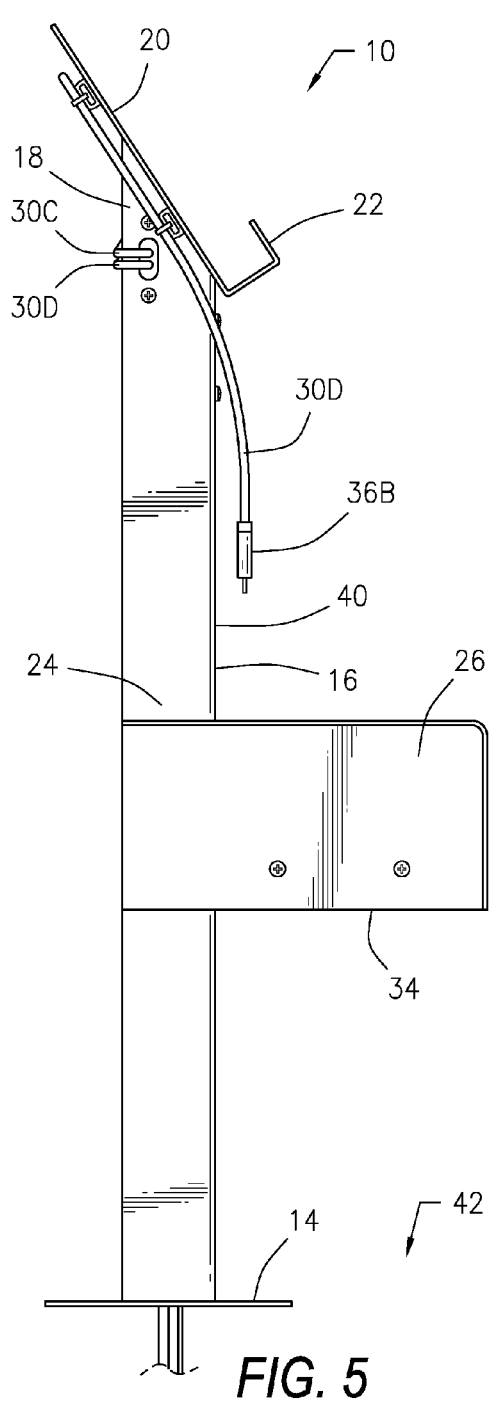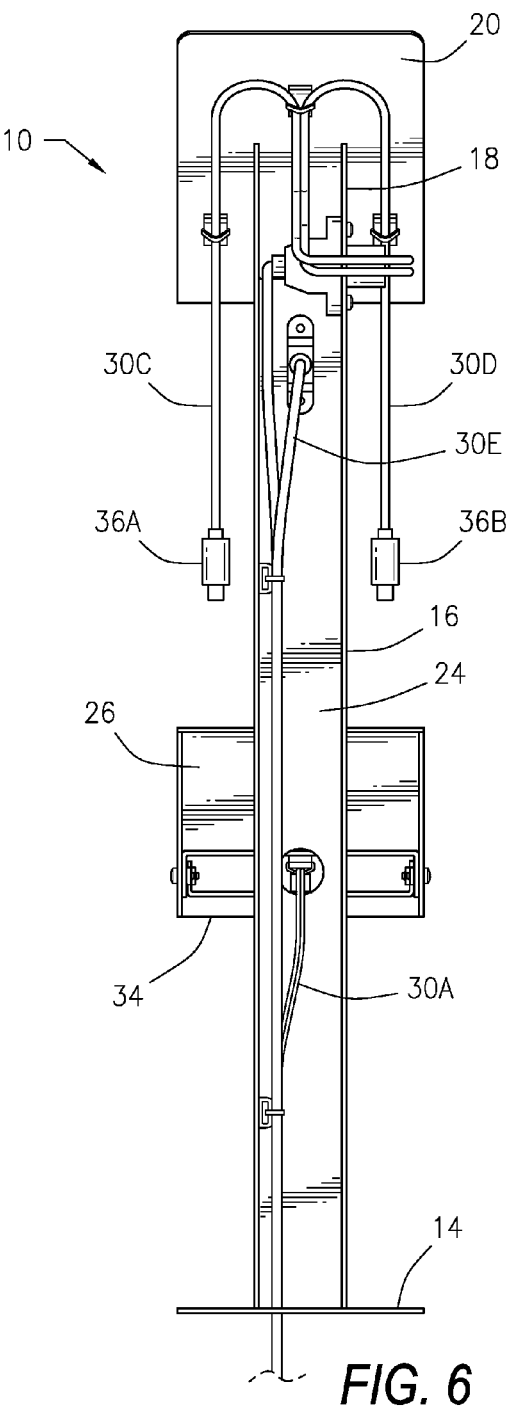

LIGHTED PHONE CHARGER AND CUP HOLDER DEVICE

BACKGROUND OF THE INVENTION

1. Field of the Invention

The present invention is a device that is intended to be installed in areas where there is limited space, such as for instance a casino, and the device serves several functions. It is a holder for holding a portable telephone while it is being charged, and the device is connected to electrical power via various types of charger cords so that the device can accommodate a variety of different types of phones for the purpose of recharging the batteries of the phones. It is a holder for a drinking cup so that the user will not spill their drink onto the electronic gaming machines and thereby cause damage to the machines and also a sticky mess for the casino to clean. It is a holder that has an elevated light which can be used as a task light without introducing excess light into the room and into the eyes of the user or into the eyes of users of gaming machines located nearby. The lighted area under the cup holder portion and on and in front of a base of the device provides room for a cigarette ash tray so the user can smoke at the gaming machine for those sections of the casino where smoking is allowed.

2. Description of the Related Art

A gambling casino strives to utilize the space within its building to include as many gamine machines as possible so as to achieve maximum revenue and to accommodate large numbers of players. They do this by placing the gaming machines very close together, thereby limiting the space available at each gaming machine for the use by the players.

However, players must have sufficient space to accommodate their needs so that they remain at the gaming machines as long as possible. These needs include a place to charge their cellular phones and other electronic devices, a place to set their drinking cup since most casinos provide free coffee and soft drinks for their patrons, a light so that the player can look at their watch or have light to see into their wallet or purse, and for those areas of a casino where smoking is allowed, a place to set an ash tray and cigarettes.

Until now, due to the limited space available to accommodate these needs, players have been accidentally spilling their drinks onto the floor of the casino and onto the gaming machines. These spills can result in significant damage to electronic gaming machines.

Also, because the batteries on the players' phones or other electronic devices must be recharged, this causes the players to stop playing so they can recharge their devices.

Additionally, smokers will stop playing to go smoke where they can proper dispose of their cigarette ashes. For heavy smokers, this can be quite frequently which cuts down on the time they are playing and thereby cuts down on the profits of the casino.

Casinos are typically lighted with low intensity light so that the players can better view the lighted displays on the gaming machines. Occasionally a player will need more light. Examples of things that might require higher intensity task lighting by a player might include looking at the player's watch, hunting for something in the player's wallet or purse, reading, etc. If sufficiently intense task lighting is not available at the gaming machines, a player will be forced to leave the machine to seek more light.

Thus, the need for close spacing of gaming machines must be balanced with the physical needs of the player to achieve comfort for the player and optimum profit for the casino.

The present invention addresses this need by a device that is designed to be installed on a counter located beside the gaming machine. The device takes up very little space due to its vertical design. The top of the device is a multi-port charging station for electronic devices. The middle portion of the device is a cup holder. A downward facing task light is located on the bottom of the cup holder and provides light on the counter under the cup holder where the user can place an item such as a cigarette ash tray or other item to be lighted.

SUMMARY OF THE INVENTION

The present invention is a device that is intended to be installed on a counter adjacent a gaming machine in gambling casinos or in other areas where there is limited space. The device serves several functions. It is a holder for a portable telephone while it is being charged and is provided with electrical power via various types of charger cords and charging ports to charge a variety of phones or other electronic devices. It is an elevated drinking cup holder. It also has a downward oriented, directional task light located under the drinking cup holder that provides light under the cup holder and on the counter adjacent the device's supporting base. This lighted area is designed to accommodate a cigarette ash tray or other item, such as a purse, glasses, keys, etc. where task lighting is needed by the player.

BRIEF DESCRIPTION OF THE DRAWINGS

FIG. 5 is a right side view of the device.

FIG. 6 is a rear view of the device.

DETAILED DESCRIPTION OF THE PREFERRED EMBODIMENT

Figure 1:
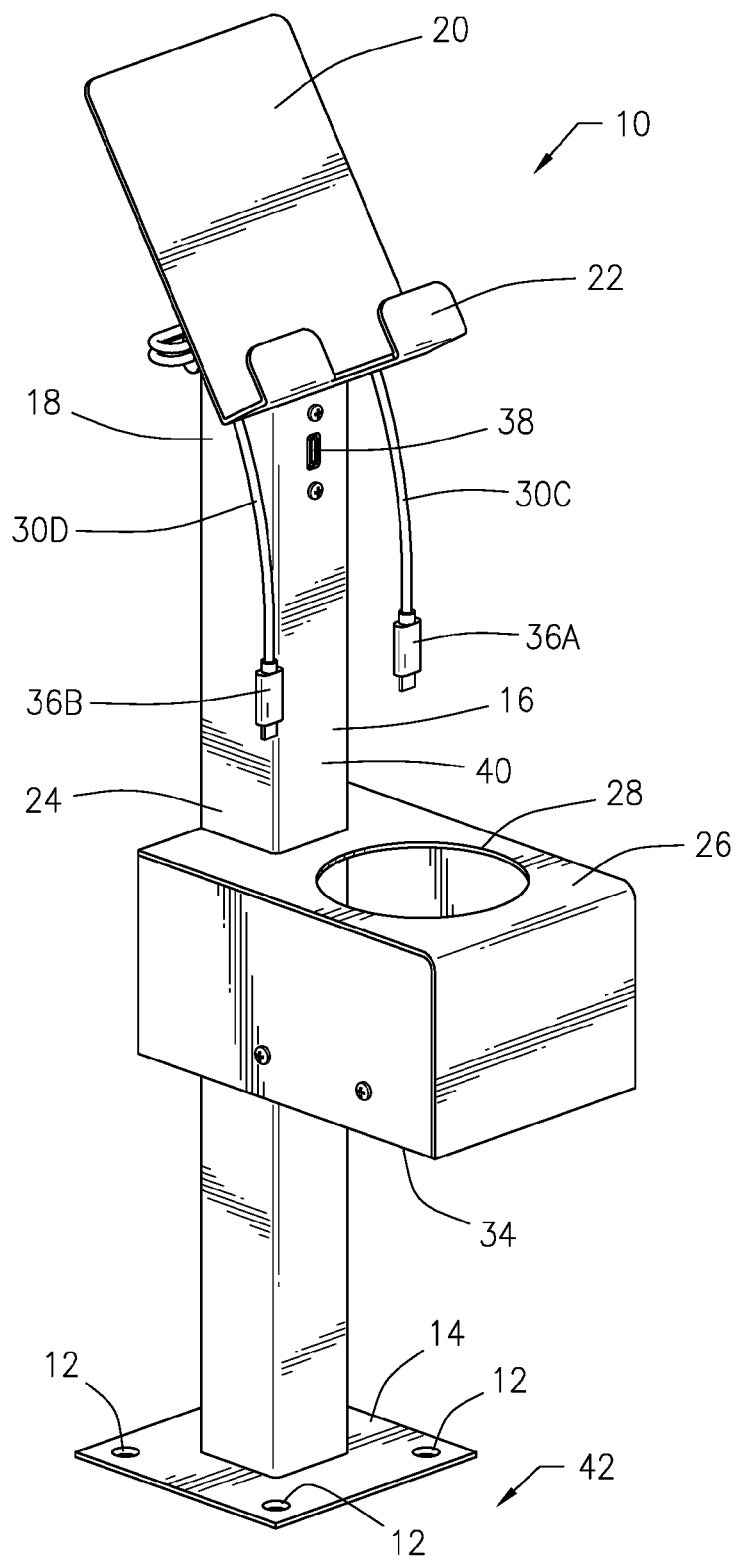
FIG. 1 is a right front perspective view of a lighted phone charger and cup holder device that is constructed in accordance with a preferred embodiment of the present invention.
Figure 2:
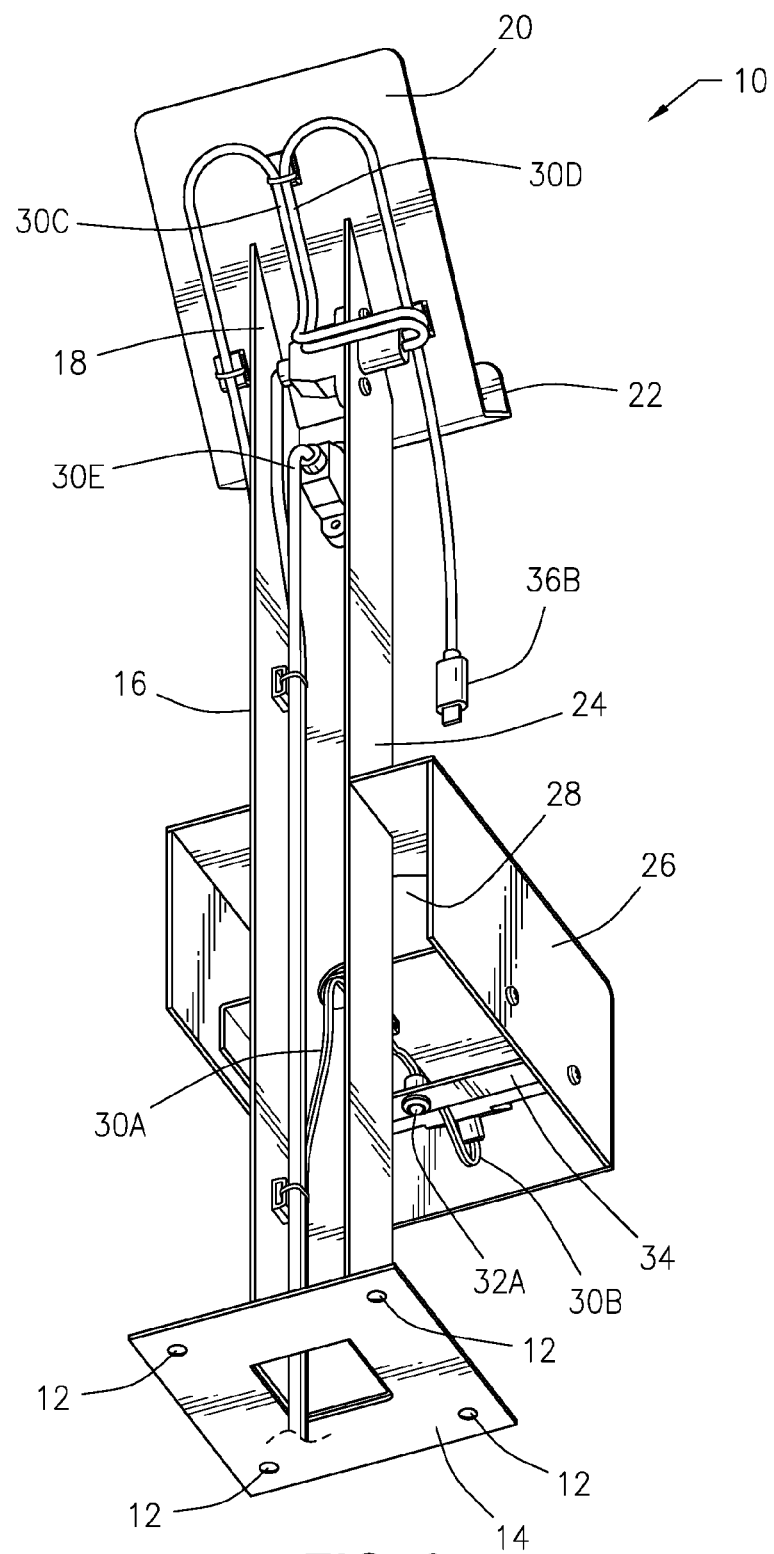
FIG. 2 is a right rear perspective view of the device of FIG. 1.
Figures 3, 4:
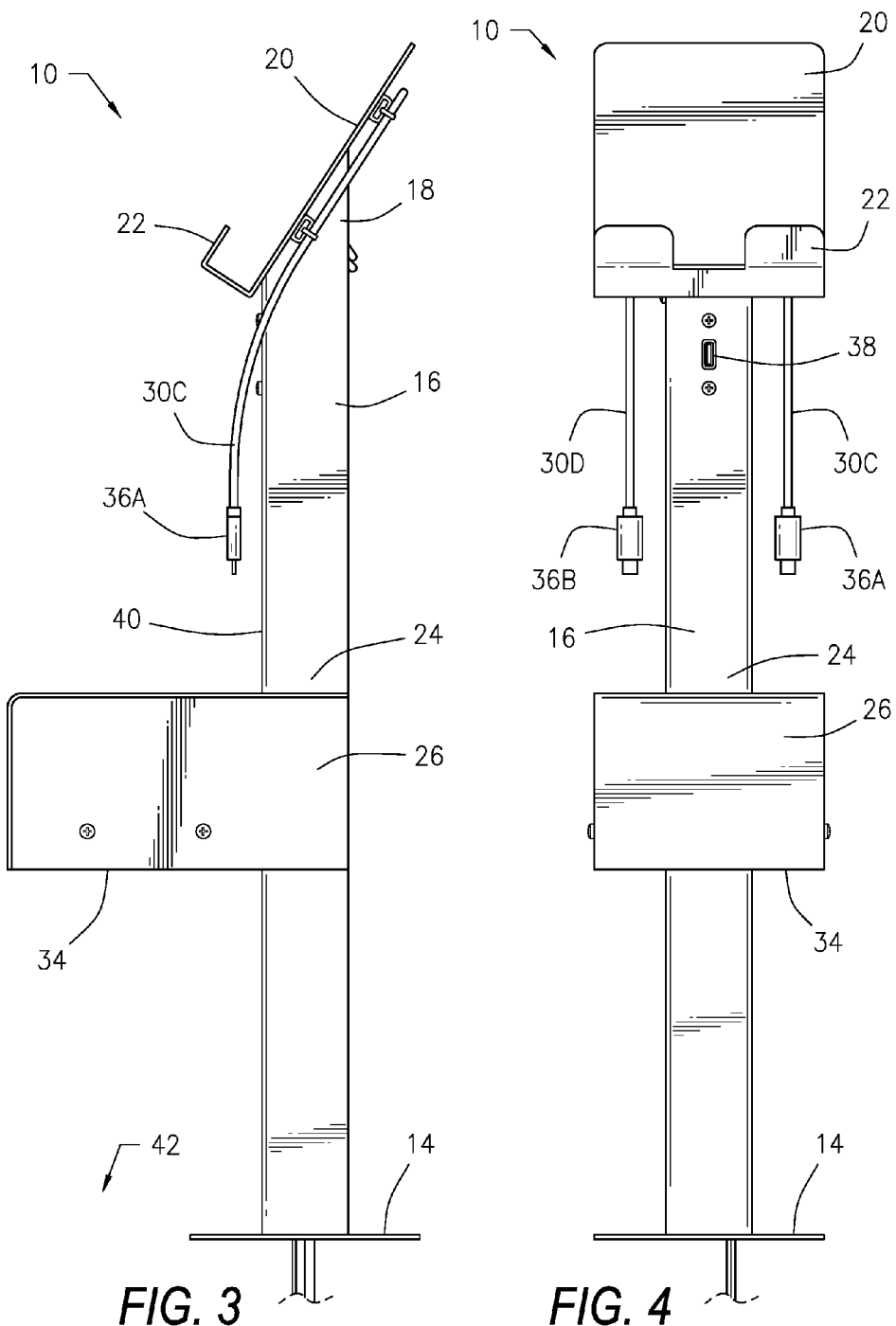
FIG. 3 is a left side view of the device.
FIG. 4 is a front view of the device.

Referring now to the drawings and initially to FIGS. 1-6 and 9, there is illustrated a lighted phone charger and cup holder device 10 that is constructed in accordance with a preferred embodiment of the present invention. The device 10 is intended to be attached to a counter (not illustrated) located adjacent to a gaming machine in a gambling casino or other installation where space is limited. The device 10 is secured to the counter via fasteners (not illustrated) such as screws or bolts that extend though fastener openings 12 provided in a horizontal base 14 for the device 10.

Figure 7:
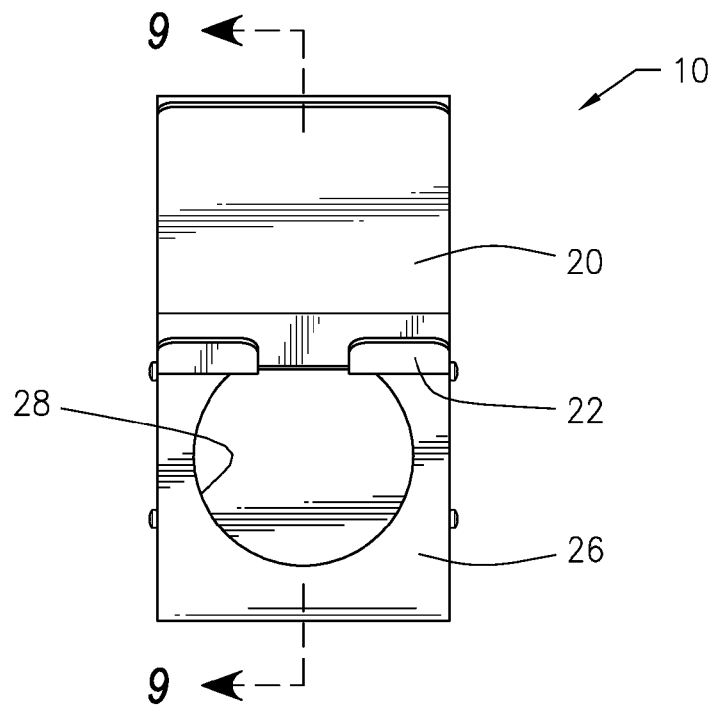
FIG. 7 is a top plan view of the device.

The base 14 has attached to it a hollow vertical support post 16 extending upward vertically from it. Referring also to FIG. 7, a top 18 of the post 16 supports an angled phone charging surface 20 provided with u-shaped retaining members 22 for holding a cellular phone on the angled phone charging surface 20. A center portion 24 of the post 16 supports an elevated cup holder 26 which extends horizontally outward from the post 16 and has a central cup opening 28 extending through the cup holder 26 for receiving a drinking cup therein.

Figure 8:
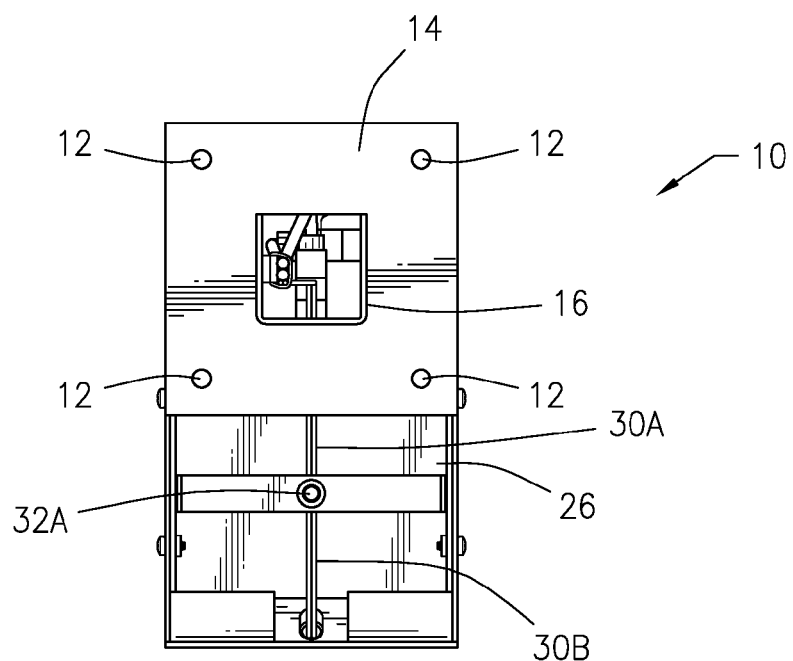
FIG. 8 is a bottom plan view of the device.
Figure 9:
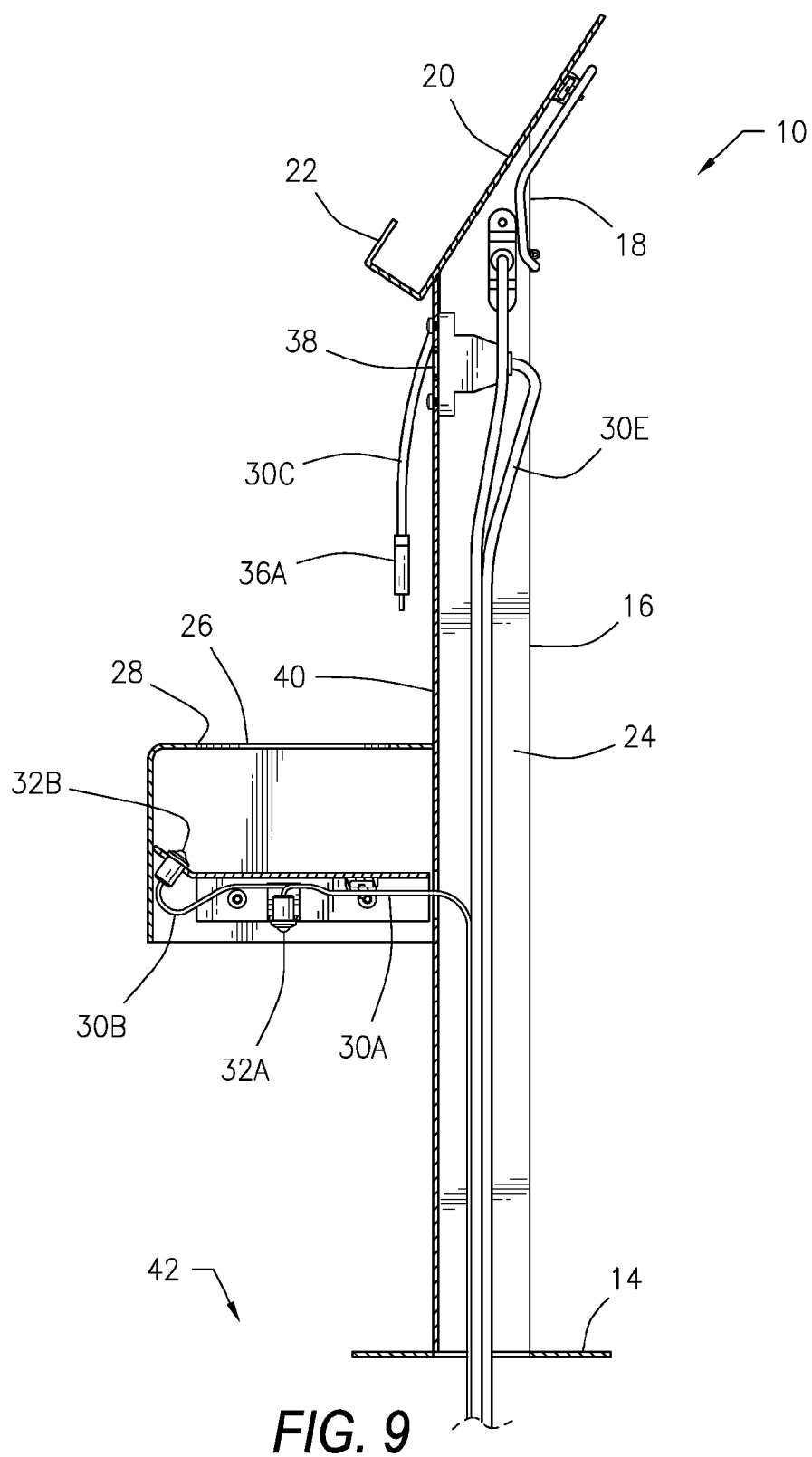
FIG. 9 is a cross sectional view of the device taken along line 9-9 of FIG. 7.

Referring also to FIG. 8, the hollow post 16 receives a plurality of electrical cables 30A, 30B, 30C, 30D, etc. that are connected to electrical house current located within the counter. The cables 30A, 30B, 30C, 30D, etc. extending to an LED light 32 located on a bottom 34 of the cup holder 26, to various charging plugs 36A and 36B located adjacent to the angled phone charging surface 20, and to one or more charging ports 38 located at a front 40 of the post 16 near its top 18. The LED light 32 is a downwardly directed task light so that it is not seen by and does not glare into the eyes of players that are seated at gaming machines located on either side of the device 10.

The LED light 32 located under the drinking cup holder 26 provides light under the cup holder 26 and on the counter adjacent the device's supporting base 14. This lighted area 42 located under the cup holder 26 and on and in front of the base 14 is designed to accommodate a cigarette ash tray or other item, such as a purse, glasses, keys, etc. where task lighting is needed by the player.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A lighted phone charger and cup holder device comprising:
   a horizontal base securable to a horizontal surface, the horizontal base is separate from other electronic devices, a vertical support post attached to and extending upward from said base,
   a phone charging surface for holding a cellular telephone provided on a top of the support post,
   an elevated cup holder provided on the post between the top of the post and the base, and
   a plurality of electrical cables connected to electrical current via the base and extending to LED lights provided on the cup holder and to charging plugs and ports located on the support post adjacent to the phone charging surface.

2. The lighted phone charger and cup holder device according to claim 1 wherein the support post is hollow.

3. The lighted phone charger and cup holder device according to claim 1 further comprising:
   the phone charging surface is angled and is provided with at least one u-shaped retaining member for holding a cellular telephone on an angle on the phone charging surface, and said u-shaped retaining member provided with a central gap to allow a phone to be charged in an upright or vertical position.

4. The lighted phone charger and cup holder device according to claim 1 further comprising:
   said elevated cup holder extends horizontally outward from the post, said cup holder provided with a central cup opening extending through the cup holder for receiving a drinking cup therein.

5. The lighted phone charger and cup holder device according to claim 4 wherein said LED lights provided on the cup holder further comprise:
   an upward and rearward oriented LED light located within the cup holder and pointed toward the central cup opening to illuminate a drinking cup placed therein.

6. The lighted phone charger and cup holder device according to claim 5 wherein said LED lights provided on the cup holder further comprise:
   a downward oriented LED light located on a bottom of the cup holder to illuminate a space under the cup holder and on and in front of the base.

7. The lighted phone charger and cup holder device according to claim 6 wherein said LED lights are not visible to persons seated or standing nearby due to the orientation of the LED lights.

8. A lighted phone charger and cup holder device comprising:
   a base securable to a surface, the base is separate from other electronic devices, a support post attached to and extending upward from said base,
   a phone charging surface provided on the support post, means for retaining a cellular phone on the charging surface,
   a cup holder provided on the support post, and
   electrical cables connected to electrical current via the base and extending to charging plugs located on the support post.

9. The lighted phone charger and cup holder device according to claim 8 further comprising:
   said electrical cables connected to LED lights provided on the cup holder.

10. The lighted phone charger and cup holder device according to claim 8 further comprising:
    said electrical cables connected to at least one charging port on the support post.

11. The lighted phone charger and cup holder device according to claim 8 wherein said phone charging surface is angled and said means for retaining a cellular phone on the charging surface is at least one u-shaped retaining member, and said u-shaped retaining member provided with a central gap to allow a phone to be charged in an upright or vertical position.

12. The lighted phone charger and cup holder device according to claim 8 further comprising:
    said elevated cup holder extends horizontally outward from the post, and
    said cup holder provided with a central cup opening extending through the cup holder for receiving a drinking cup therein.

13. The lighted phone charger and cup holder device according to claim 12 further comprising:
    a downward oriented LED light located on a bottom of the cup holder to illuminate a space located under the cup holder and on and in front of the base.

14. The lighted phone charger and cup holder device according to claim 13 further comprising:
    an upward and rearward oriented LED light located within the cup holder and pointed toward the central cup opening to illuminate a drinking cup placed therein.

15. The lighted phone charger and cup holder device according to claim 14 wherein said LED lights are not visible to persons seated or standing nearby due to the orientation of the LED lights.

16. The lighted phone charger and cup holder device according to claim 8 further comprising:
    said electrical cables connected to LED lights provided on the cup holder and to at least one charging port located on the support post,
    the phone charging surface oriented at an angle and means for retaining a cellular phone on the charging surface is provided by at least one u-shaped retaining member attached to a lower end of the phone charging surface, and said u-shaped retaining member provided with a central gap to allow a phone to be charged in an upright or vertical position, said cup holder is elevated above the base and extends horizontally outward from the post, said cup holder is provided with a central cup opening extending through a top surface of the cup holder for receiving a drinking cup therein, and a downward pointing LED light located on a bottom of the cup holder to illuminate a space that is located under the cup holder and on and in front of the base, an upward and rearward oriented LED light located within the cup holder and pointed toward the central cup opening to illuminate a drinking cup placed therein.

* * * * *